United States Patent [19]

Kirikami et al.

[11] Patent Number: 4,907,406
[45] Date of Patent: Mar. 13, 1990

[54] COMBINED GAS TURBINE PLANT

[75] Inventors: Seiichi Kirikami; Isao Sato; Fumiyuki Hirose; Osamu Arai; Nobuyuki Iizuka, all of Hitachi, Japan

[73] Assignee: Hitachi, Ltd., Tokyo, Japan

[21] Appl. No.: 209,939

[22] Filed: Jun. 22, 1988

[30] Foreign Application Priority Data

Jun. 23, 1987 [JP] Japan .................... 62-154487

[51] Int. Cl.$^4$ .................... F02C 6/18; F02C 9/18
[52] U.S. Cl. .................... 60/39.182; 60/39.29; 60/39.5
[58] Field of Search .......... 60/39.182, 39.29, 39.5, 60/732, 733; 415/26, 27, 28

[56] References Cited

U.S. PATENT DOCUMENTS

| | | | |
|---|---|---|---|
| 2,732,125 | 1/1956 | Ruby | 60/39.29 |
| 2,813,672 | 11/1957 | Long et al. | 415/27 |
| 3,006,145 | 10/1961 | Sobey | 60/39.29 |
| 3,975,900 | 8/1976 | Pfefferle | 60/39.03 |
| 4,106,286 | 8/1978 | Sakai et al. | 60/39.182 |
| 4,112,676 | 9/1978 | Decorso | 60/733 |
| 4,160,805 | 7/1979 | Inaba et al. | 60/39.182 |
| 4,164,035 | 8/1979 | Glennon et al. | 60/39.29 |
| 4,420,929 | 12/1983 | Jorgensen et al. | 60/733 |
| 4,466,241 | 8/1984 | Invi et al. | 60/39.182 |
| 4,572,110 | 2/1986 | Haeflich | 60/39.182 |
| 4,693,213 | 9/1987 | Yanai et al. | 60/39.182 |

FOREIGN PATENT DOCUMENTS 61-66019 4/1986 Japan .

Primary Examiner—Louis J. Casaregola
Attorney, Agent, or Firm—Antonelli, Terry & Wands

[57] ABSTRACT

A combined gas turbine plant comprises an air compressor, a combustor including a combustion chamber, a gas turbine, a steam turbine, and an exhaust heat recovery device having a denitration device and arranged at a location through which an exhaust gas passage for leading exhaust gas from the gas turbine to the atmosphere extends. An air extraction pipe equipped with a valve is provided for extracting a part of the air from the air compressor to prevent surging of the air compressor during starting of the plant, and another air extraction pipe equipped with a valve is provided for extracting a part of the air from an air passage extending from the compressor to the combustion chamber to improve stability of a flame and combustibility in the combustion chamber during the plant starting. The extraction pipes extend to and hence lead the extracted air into a portion of the exhaust gas passage located downstream of the denitration device.

9 Claims, 5 Drawing Sheets

COMBINED GAS TURBINE PLANT

BACKGROUND OF THE INVENTION

1. Field of the Invention

This invention relates to a combined gas turbine plant comprising a combined gas turbine device which is adapted to serve as a prime mover and includes in combination a gas turbine, an exhaust heat recovery device and a steam turbine, the combined gas turbine plant being capable of being constituted as a combined gas turbine power plant or the like.

2. Description of the Prior Art

In general, a known type of combined gas turbine device comprises: an air compressor; a combustor for generating a gas of high temperature and high pressure by burning fuel while utilizing as an oxidizer air compressed by the air compressor; a gas turbine adapted to be operated by the gas of high temperature and high pressure generated by the combustor; an exhaust heat recovery device such as an exhaust heat recovery heat exchanger arranged at a location through which an exhaust gas passage for leading an exhaust gas from the gas turbine to the atmosphere extends, the exhaust heat recovery device generating stream of high temperature and high pressure by recovering exhaust heat from the exhaust gas from the gas turbine; and a steam turbine driven or rotated by the steam of high temperature and high pressure generated by the exhaust heat recovery device.

In recent years, combined gas turbine devices have been put into practical use, and a variety of combined gas turbine plants such as combined gas turbine power plants in which a combined gas turbine device is utilized as a prime mover have been constructed. In such combined gas turbine plants, there is a critical need to reduce the amount of NOx contained in the exhaust gases exhausted from the combined gas turbine device which is incorporated in the plant, in order to prevent the environmental pollution. Also, the plant is required to have good starting performance.

Conventionally, there has been known a combined gas turbine power plant in which a denitration device is installed in an exhaust heat recovery device for the purpose of reducing the amount of NOx contained in exhaust gas, and air extraction means is provided. During starting of the plant, i.e., until the time when the plant reaches an operating condition under a predetermined load, the air extraction means extracts a part of the air flowing from an air compressor to a combustion chamber of a combustor, and leads the extracted air into a portion of an exhaust duct of the gas turbine disposed on the upstream side, as viewed in an exhaust gas flow direction, of the exhaust heat recovery device. The extraction means is provided for preventing surging of the air compressor during starting of the plant, and for improving the ignitability and stability of flames by slightly increasing the fuel density in the combustor at a certain point of time during the starting process. However, the power plant of this type involves a problem in that the denitration efficiency of the denitration device deteriorates with the resultant increase in the amount of NOx contained in the exhaust gas. Because, the air introduced into the exhaust duct of the gas turbine by the extracting means is mixed with the exhaust gas from the gas turbine and hence lowers the temperature of the exhaust gas, and the exhaust gas of lowered temperature is introduced into the denitration device. Furthermore, since a long time is required for the denitration device to be heated up to a predetermined temperature by the exhaust gas, the length of time required for starting the plant becomes large.

SUMMARY OF THE INVENTION

It is therefore an object of the invention to provide a combined gas turbine plant which includes air extraction means capable of effecting the air extraction, without adversely affecting the denitration performance of the denitration device and hence without accompanying the disadvantages such as an increase in the amount of NOx in the exhaust gas and lengthening of the time required for starting the plant.

According to the invention, there is provided a combined gas turbine plant comprising: an air compressor; a combustor including a combustion chamber and adapted to generate a gas of high temperature and high pressure by burning fuel in the combustion chamber while utilizing as an oxidizer an air compressed by the air compressor; a gas turbine adapted to be operated by the gas of high temperature and high pressure generated by the combustor; exhaust heat recovery means including denitration means and arranged at a location through which an exhaust gas passage for leading an exhaust gas from the gas turbine to the atmosphere extends, the exhaust heat recovery means recovering exhaust heat from the exhaust gas to generate steam of high temperature and high pressure; a steam turbine driven by the steam of high temperature and high pressure generated by the exhaust heat recovery means; and air extraction means for leading, during starting of the plant, a part of the air flowing from the air compressor to the combustion chamber of the combustor into a portion of the exhaust gas passage located downstream of the denitration means.

Other and further objects, features and advantages of the invention will become more apparent from the following description with reference to the accompanying drawings.

DETAILED DESCRIPTION OF THE PREFERRED EMBODIMENT

Figure 2:
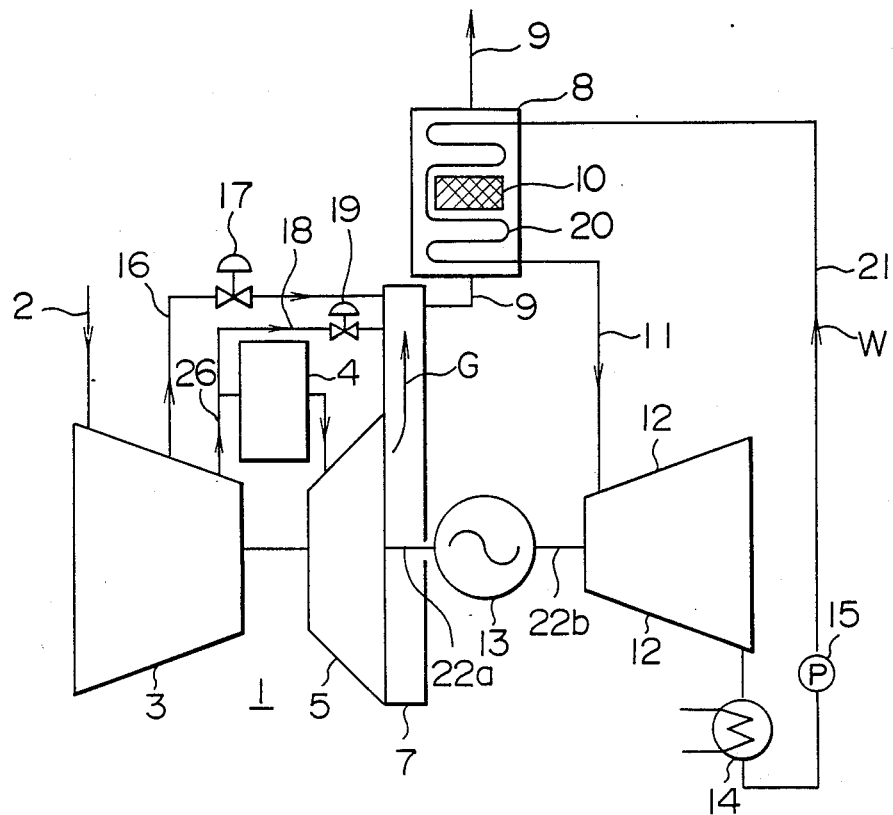
FIG. 2 is a schematic view of a conventional combined gas turbine power plant.

FIG. 2 shows a combined gas turbine power plant exemplified as a conventional combined gas turbine plant including a gas turbine device 1 and a steam turbine 12, with the gas turbine device 1 includes an air compressor 3 for compressing air introduced through an inlet pipe 2, a combustor 4 for burning fuel while utilizing the air compressed by the air compressor 3 as an oxidizer, and a gas turbine 5 operated by the gas of high temperature and high pressure generated due to the above-described combustion and serving as an operating fluid for the gas turbine.

An exhaust heat recovery heat exchanger 8 which constitutes an exhaust heat recovery means is arranged at a location through which an exhaust pipe or an exhaust gas passage 9 extends. As a result of this, an exhaust gas G in an exhaust duct 7 of the gas turbine 5 is led to the atmosphere after having passed through the heat exchanger 8. The heat exchanger 8 is provided with a zigzag water pipe 20 therein, and water is, as designated by an arrow W, supplied to the zigzag water pipe 20 through a pipe 21 by the operation of a water supply pump 15. The water flowing through the zigzag water pipe 20 recovers the exhaust heat of the exhaust gas flowing through the heat exchanger 8 and is changed to a steam of high temperature and high pressure The steam is introduced into a steam turbine 12 through a main steam pipe 11 to drive or rotate the steam turbine 12.

The gas turbine 5 and the steam turbine 12 are connected to a generator 13 via shafts 22a and 22b, and the generator 13 is activated by the two turbines 5 and 12. The heat exchanger 8 is provided with a denitration device 10 therein in order to reduce the amount of NOx in the exhaust gas exhausted to the atmosphere through an exhaust gas passage 9. The denitration device 10 is so constructed that, when it is heated up to a predetermined temperature by the exhausted gas, ammonia is introduced thereinto so as to make the the denitration device perform denitration function of reducing the amount of NOx in the exhaust gas. In FIG. 2, reference numeral 14 represents a condenser.

Figure 3:
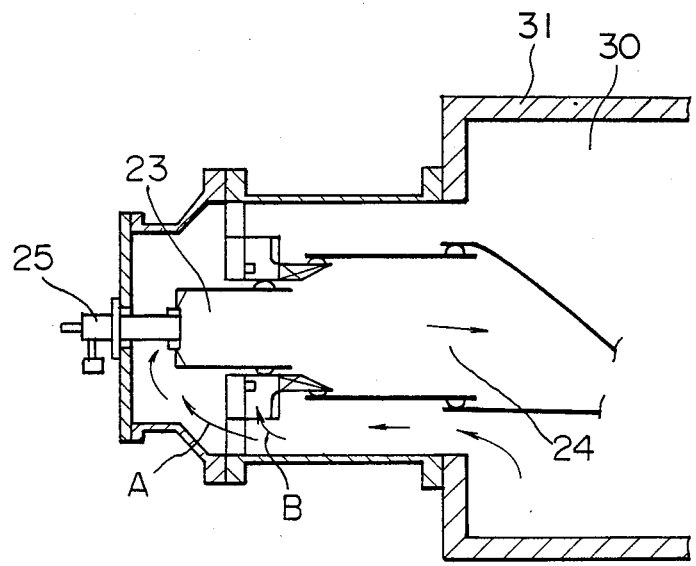
FIG. 3 is a schematic cross-sectional view illustrating the structure of a combustor for use in the power plants shown in FIGS. 1 and 2.

The combustor 4 is the combustor of the type referred to as the two-staged combustor. The two-staged combustor is the type of combustor well-known as the combustor capable of reducing the amount of NOx in exhaust gases. As shown in FIG. 3, this two-staged combustor includes a combustion chamber having a primary burning region or an auxiliary burning region 23 and a secondary burning region or a main burning region 24 located on the downstream side of the former. The two-staged combustor is constructed to cause a diffusion burning of the fuel injected through a fuel nozzle 25 into the primary burning region 23 with an air introduced, as designated by an arrow A, into the primary burning region 23, and to cause a premixed combustion in the secondary burning region 24 with a secondary air introduced into the region 24 as designated by an arrow B.

The two-staged combustor of the above-described type is disclosed, for example, in Japanese Patent Laid-Open No. 61-66019. The disclosed two-staged combustor includes a by-pass pipe for leading a part of an air flowing from the air compressor to the combustion chamber of the combustor into an exhaust chamber of the gas turbine. It further includes a valve for regulating the amount of air flowing through the by-pass pipe so that the amount of air introduced into the primary and secondary burning regions may be regulated by controlling the valve.

As shown in FIG. 2, the power plant includes an air extraction pipe 16 extending from an intermediate stage of the air compressor 3 to the exhaust duct 7 of the gas turbine. The extraction pipe 16 is equipped with a valve 17. The extraction pipe 16 and the valve 17 are provided for preventing surging of the air compressor 3 during starting of the plant. More particularly, the valve 17 is kept opened until the rotational speed of the gas turbine device 1 reaches about 95% of its rated rotational speed during starting of the plant, in order to prevent surging of the air compressor 3 by extracting a part of air from the air compressor 3 and leading the extracted air into the exhaust duct 7 through the extraction pipe 16.

The power plant further includes an air extraction pipe 18 and a valve 19. The extraction pipe 18 is branched from an air passage 26 which connects the discharge port of the air compressor 3 and the combustion chamber of the combustor 4, and extends to the exhaust duct 7. The valve 19 is controlled to be opened to lead a part of air flowing in the air passage 26 into the exhaust duct 7 through the extraction pipe 18, when a flame in the combustion chamber of the combustor 4 is to be shifted or transferred from the primary burning region 23 to the secondary burning region 24 under a low load condition of the power plant. As a result, the fuel content or concentration in the combustion chamber is slightly raised, so that the stability of the flame may be maintained and the flame transfer may be readily caused.

It is impossible to increase an amount of air to be extracted through the extraction pipe 16 and the valve 17 above a predetermined value, and the maximum value of the same is limited to about 10% of the total amount of air flowing through the air compressor 3. Because, the diameter of the extraction pipe 16 cannot be made larger than a predetermined value since air is extracted from the intermediate stage of the air compressor 3. On the other hand, the air extraction conducted through the pipe 18 and the valve 19 is a so called wrapper extraction in which air is extracted from a space 30 (FIG. 3) surrounded by an element 31 ordinarily referred to as a wrapper. The wrapper is provided around the combustion chamber of the combustor 4 and constitutes a part of the air passage 26 extending from the air compressor 3 to the combustion chamber. Since the pipe 18 extends from the wrapper, a pipe of large diameter can be employed as this pipe 18. Therefore, if necessary, the amount of air extracted by the wrapper extraction may be made to about 30 to 50% of an amount of air discharged from the air compressor 3.

However, a problem arises in that, when air is introduced into the exhaust duct 7 by the air extraction for preventing surging and/or 4 wrapper extraction, the air is mixed with the exhaust gas from the gas turbine 5, causing the temperature of the exhaust gas introduced into the denitration device 10 of the exhaust heat recovery heat exchanger 8 to be lowered.

Figure 4:
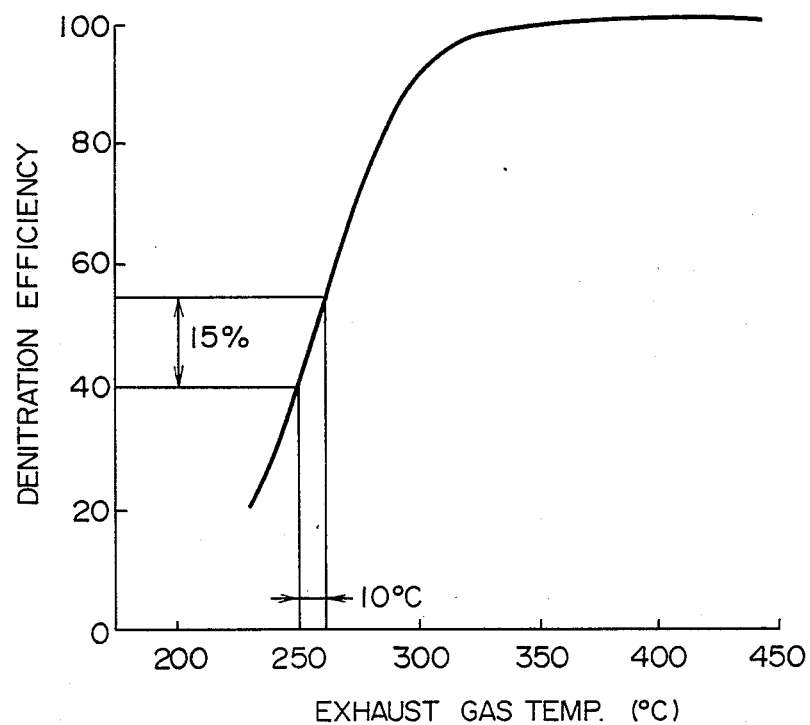
FIG. 4 is a schematic view illustrating the relationship between the denitration efficiency of a denitration device and the temperature of an exhaust gas flowing through the denitration device.

FIG. 4 illustrates the relationship between the denitration efficiency of the denitration device 10 and the temperature of the exhaust gas flowing through the denitration device 10. As can be clearly seen from FIG. 4, the denitration efficiency exceedingly deteriorates when the temperature of the exhaust gas becomes 300° C. or lower. For example, when the temperature of the exhaust gas is lowered by 10° C. at near 250° C., the denitration efficiency deteriorates by about 15%. Therefore, when the above-described extraction is conducted and, for example, the extracted air of 200° C. is mixed with the exhaust gas of relatively high temperature of 400° C. in the ratio of 1/9, the temperature of the exhaust gas is lowered by about 20% and hence the denitration efficiency deteriorates by about 30%. Furthermore, as will be described in detail hereinafter, if the temperature of the exhaust gas is lowered as described above, a relatively long time is necessarily required to warm up the denitration device 10 up to a temperature at which it achieves its predetermined denitration performance. Therefore, a problem arises in that the time required for starting the power plant becomes long.

Figure 1:
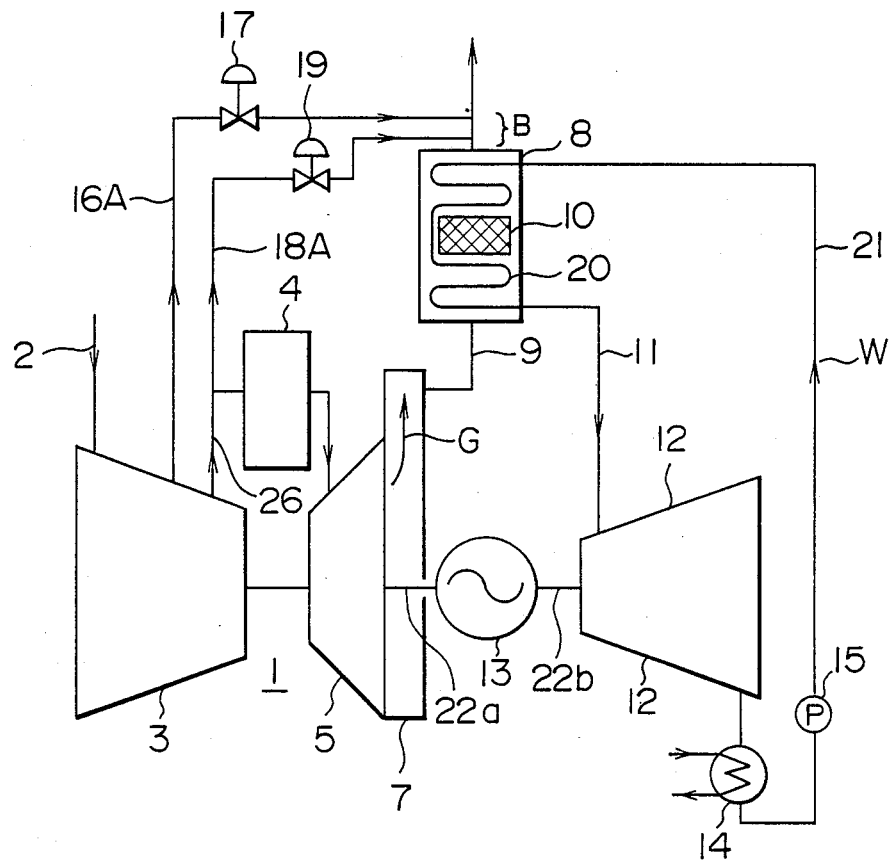
FIG. 1 is a schematic view of a combined gas turbine power plant according to an embodiment of the invention.

Next, a combined gas turbine plant according to an embodiment of the invention will be described which is constructed as a combined gas turbine power plant, and which can overcome the above-described problems experienced by the prior art. The description given hereunder is directed mainly to the differences from the above-described conventional art, and detailed description on the similar parts to those of the conventional art is omitted. In FIGS. 1 and 2, similar parts are designated by like reference numerals.

A combined gas turbine power plant shown in FIG. 1 according to an embodiment of the invention comprises a gas turbine device 1 and a steam turbine 12. The gas turbine device 1 includes an air compressor 3 for compressing air introduced through an inlet pipe 2, a combustor 4, and a gas turbine 5. An exhaust heat recovery heat exchanger 8 constituting an exhaust heat recovery means is arranged at a location through which an exhaust pipe or an exhaust gas passage 9 extends from an exhaust duct 7 of the gas turbine 5 to the atmosphere. A denitration device 10 is provided in the heat exchanger 8. The heat exchanger 8 has a zigzag water pipe 20 therein, and water is, as designated by an arrow W, supplied to the zigzag water pipe 20 through a pipe 21 by the operation of a water supply pump 15. The water flowing through the zigzag water pipe 20 recovers the exhaust heat of the exhaust gas flowing through the heat exchanger 8 and is changed to a steam of high temperature and high pressure. The steam is introduced into a steam turbine 12 through a main steam pipe 11. The gas turbine 5 and the steam turbine 12 are connected to a generator 13 via shafts 22a and 22b. The above described structure are the same as that of the conventional art shown in FIG. 2. Further, similarly to the conventional art, the combustor 4 is a two-staged combustor including a combustion chamber having a primary burning region or a auxiliary burning region 23 (FIG. 3) and a secondary burning region or a main burning region 24 located on the downstream side of the former.

The power plant according to the embodiment of the invention differs from the conventional art in the following points. Namely, in this embodiment, an air extraction pipe 16A extends from the intermediate stage of the air compressor 3 to a portion B of the exhaust gas passage 9 located downstream of the heat exchanger 8 as viewed in an exhaust gas flow direction, and a valve 17 is mounted on this air extraction pipe 16A. Further, an air extraction pipe 18A is branched from the air passage 26 extending from the discharge port of the air compressor 3 to the combustion chamber of the combustor 4 and extends to the portion B of the exhaust gas passage 9 located downstream of the heat exchanger 8 or the denitration device 10. The valve 19 is mounted on this air extraction pipe 18A.

The air extraction pipe 16A and the valve 17 of this embodiment are adapted to effect air extraction for preventing surging of the air compressor 3 similarly to the air extraction pipe 16 and the valve 17 of the conventional art shown in FIG. 2. The air extraction pipe 18A and the valve 19 effect air extraction similar to that effected by the air extraction pipe 18 and the valve 19 of the conventional art. That is, when a flame in the combustion chamber of the combustor 4 is to be shifted or transferred from the primary burning region 23 (see FIG. 3) to the secondary burning region 24 under a low load condition of the power plant, the air extraction is effected through the pipe 18A and the valve 19 so as to raise the fuel content or concentration in the combustion chamber, thereby maintaining the stability of the flame and facilitating the flame transfer. The air extraction performed through the extraction pipe 18A and the valve 19 may be called a wrapper extraction similarly to the conventional art.

However, according to the embodiment of the invention, air extracted through the air extraction pipes 16A and 18A is introduced to the portion B of the exhaust gas passage 9 located downstream of the denitration device 10, and hence the extracted air is not mixed with the exhaust gas discharged from the gas turbine 5 and introduced into the heat exchanger 8. Consequently, the above-described disadvantages experienced by the conventional art which are caused by the mixing of the extracted air with the exhaust gas can be overcome.

Figure 5:
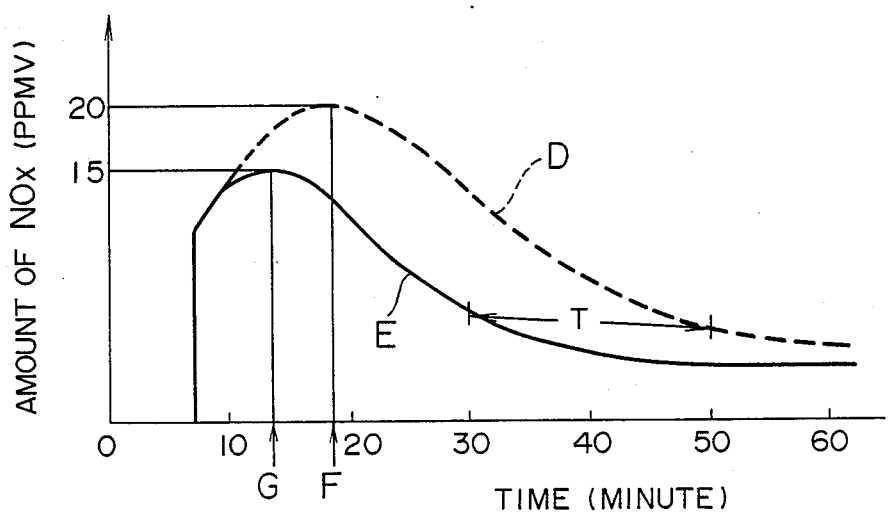
FIG. 5 illustrates the performance of the power plant according to the embodiment of the invention shown in FIG. 1, in comparison with that of the conventional power plant shown in FIG. 2.

FIG. 5 illustrates the performance of the power plant of the illustrated embodiment in comparison with the conventional power plant. In this figure, the abscissa represents the time (minute) elapsed from the beginning of starting of the plant, while the ordinate represents the amount or content of NOx (ppmV) in the exhaust gas. A dotted line D represents the performance of the conventional plant, and a solid line E represents the performance of the plant of the illustrated embodiment.

In the conventional plant whose performance is shown by the dotted line D, the denitration device 10 is gradually heated by the exhaust gas with the lapse of time from the beginning of the starting of the plant, and at a point of time F the temperature is reached at which the denitration device 10 can perform its rated denitration function. Therefore, ammonia is injected into the denitration device 10 at the time point F so as to cause denitration function by the denitration device 10. Thus, after the time point F the amount of NOx in the exhaust gas is gradually lowered. At a point of time when 50 minutes have elapsed, the amount of NOx is lowered to a target level. At this time point, the starting process of the plant is completed, and the plant is shifted to the operation under a predetermined load. In this conventional plant, the peak value of the amount of NOx contained in the exhaust gas reaches 20 ppmV.

On the other hand, in the illustrated embodiment in which air extracted through the pipes 16A and 18A is not mixed with the exhaust gas introduced into the heat exchanger 8 and hence the temperature of the exhaust gas flowing through the denitration device 10 is not lowered as described above, the denitration device 10 may be warmed up in a relatively short time period. As a result, in the plant according to this embodiment whose performance is shown by the solid line E, the temperature of the denitration device 10 reaches the level at which the denitration device 10 can perform its rated denitration function at a point of time G which is significantly earlier than the point of time F. At this time point G, ammonia can be injected into the denitration device 10. Therefore, with the time lapse of 30 minutes, the amount of NOx in the exhaust gas is lowered to the target level, and the starting of the plant is completed at this point and the plant is shifted to an operation under a predetermined load. Consequently, the time required for starting the plant is shortened by T, that is, by 20 minutes as compared with the time required for starting the conventional plant. The peak value of the amount of NOx in the exhaust gas is lowered to 15 ppmV, in contrast with 20 ppmV of the conventional plant.

In this embodiment, the combustor 4 is a two-staged combustor as shown in FIG. 3, and the air extraction through the extraction pipe 18A is conducted when a flame is to be shifted from the primary burning region to the secondary burning region. However, it is possible to employ a single-staged combustor whose combustion chamber includes a single burning region, and to lead an air through the extraction pipe 18A to the portion B of the exhaust gas passage 9 at the time of combustion under low load during the plant starting. With such structure, the fuel content in the combustion chamber is increased to cause preferable burning. As a result, the temperature of the gas discharged from the combustor and introduced to the gas turbine 5 can be raised, causing the temperature of the exhaust gas introduced from the gas turbine 5 into the heat exchanger 8 to be raised. The advantages obtained by raising the temperature of the exhaust gas introduced into the heat exchanger 8 are those which have been previously described.

Furthermore, in the case where the plant is constructed to perform a so called combustion monitor function for checking abnormal combustion by measuring the temperatures of the exhaust gas from the gas turbine 5 at a plurality of monitoring points in the exhaust duct 7, an advantage can be obtained in which abnormal combustion during the plant starting can be as well checked in addition to checking the same during the rated operation of the plant. Namely, according to the illustrated embodiment, the air extracted through the extraction pipes 16A and 18A is, differing from the conventional art, introduced into the exhaust duct 7. Thus, during starting of the plant while the air extraction is being conducted, the temperature of the exhaust gas in the exhaust duct 7 can be measured to check for abnormal combustion without being adversely affected by the air extraction.

As will be clearly seen from the above description, according to the invention, a part of the air flowing from the air compressor to the combustion chamber of the combustor may be extracted without adversely affecting the performance to denitrate the exhaust gas, with the result that the time required for starting the combined gas turbine plant may be shortened.

We claim:

1. A combined gas turbine plant comprising:
    an air compressor;
    a combustor including at least one combustion chamber and adapted to generate a gas of high temperature and high pressure by burning fuel in said at least one combustion chamber while utilizing as an oxidizer air compressed by said air compressor;
    a gas turbine adapted to be operated by the gas of high temperature and high pressure generated by said combustor;
    exhaust heat recovery means including denitration means arranged at a location through which an exhaust gas passage for leading exhaust gas from said gas turbine to the atmosphere extends, said exhaust heat recovery means recovering exhaust heat from said exhaust gas to generate steam of high temperature and high pressure;
    a steam turbine driven by the steam of high temperature and high pressure generated by said exhaust heat recovery means;
    air extraction means for leading a part of the air flowing from said air compressor to said at least one combustion chamber of said combustor into a portion of said exhaust gas passage located downstream of said denitration means.

2. A combined gas turbine plant according to claim 1, wherein said air extraction means includes an air extraction pipe and valve means for said air extraction pipe, said air extraction pipe being branched from an air passage extending from a discharge port of said air compressor to said combustion chamber of said combustor, and extending to said portion of said exhaust gas passage.

3. A combined gas turbine plant according to claim 2, wherein said combustor is a two-stage combustor, and said valve means is constructed to be opened to lead the air through said extraction pipe into said portion of said exhaust gas passage when fuel is introduced into a second combustion chamber of said two-staged combustor.

4. A combined gas turbine plant according to claim 1, wherein said air extraction means includes an air extraction pipe for preventing surging of said air compressor and valve means for said air extraction pipe, said air extraction pipe extending from an intermediate stage of said air compressor to said portion of said exhaust gas passage.

5. A combined gas turbine plant according to claim 2, wherein said air extraction means includes an air extraction pipe for preventing surging of said air compressor and valve means for the latter air extraction pipe, the latter air extraction pipe extending from an intermediate stage of said air compressor to said portion of said exhaust gas passage.

6. A combined gas turbine plant according to claim 3, wherein said air extraction means includes an air extraction pipe for preventing surging of said air compressor and valve means for the latter air extraction pipe, the latter air extraction pipe extending from an intermediate stage of said air compressor to said portion of said exhaust gas passage.

7. A combined gas turbine plant comprising:
    an air compressor means;
    a combustor means for generating a gas of a high temperature and a high pressure;
    a gas turbine means operable by said combustor means;
    exhaust heat recovery means including denitration means disposed in an exhaust gas passage means of said gas turbine means; and
    means for extracting air from said compressor means and for bypassing said denitration means by leading the extracted air to a portion of the exhaust gas passage means downstream of the denitration means thereby preventing a cooling of exhaust gases supplied to the denitration means.

8. A combined gas turbine plant according to claim 7, wherein said means for extracting and for bypassing includes an air passage means for connecting a discharge port means of said air compressor means to the exhaust gas passage means downstream of the denitration means.

9. A combined gas turbine plant according to claim 8, wherein said means for extracting and for bypassing includes a further air passage means for connecting an intermediate stage of the air compressor means to the exhaust gas passage means downstream of the denitration means.

* * * * *